Dec. 23, 1947. A. A. JOHNSON 2,433,124
ELECTRIC FLATIRON
Original Filed Nov. 18, 1940
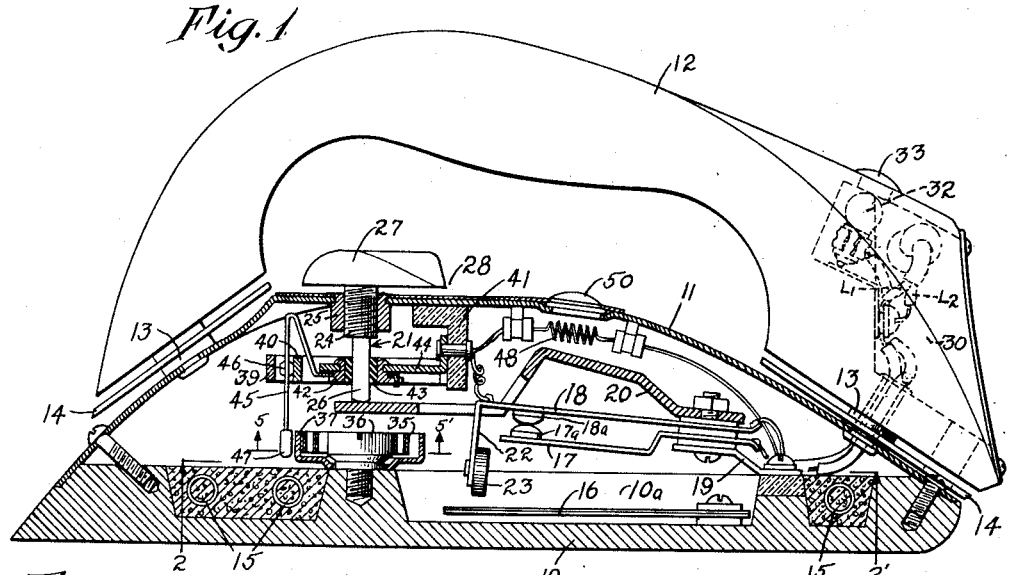
INVENTOR Patented Dec. 23, 1947

2,433,124

UNITED STATES PATENT OFFICE 2,433,124

ELECTRIC FLATIRON

Arthur A. Johnson, Bridgeport, Conn., assignor to Casco Products Corporation, Bridgeport, Conn., a corporation of Connecticut Continuation of application Serial No. 366,097, November 18, 1940. This application April 20, 1945, Serial No. 589,367

23 Claims. (Cl. 177—311)

The present invention relates to electric flatirons, and especially to electric flatirons having automatic temperature control means with means for indicating the temperature of the iron.

This application is a continuation of my copending application Serial No. 366,097, filed November 18, 1940, which has since become abandoned.

In automatically controlled flatirons heretofore proposed, means have been provided for selectively adjusting the automatic temperature control means in order to maintain the temperature of the iron within a selected range suitable for ironing a given kind of material. In such irons, means are provided for indicating the temperature of the iron to the user, or to provide a signal which is energized when the temperature of the iron rises to the selected range.

However, when a temperature indicating means is used in irons having an automatic temperature control means, the temperature fluctuates within the selected range, as a result of the lag in operation of said means, and causes corresponding fluctuations in the temperature indicator which are disconcerting to the user. Moreover, observation of the temperature indicator, which necessarily includes the reading of a scale, is relatively distracting and requires more attention than a housewife is usually willing to devote thereto during use of the iron.

In proposed electric irons of the aforesaid type having a signal, such as a lamp which is illuminated when the temperature of the iron rises to the selected range, no provision is made for extinguishing the signal if the temperature is above the selected range, as would be the case if the adjustment of the automatic temperature control means were changed from a higher to a lower temperature, or if the automatic temperature control means should fail to operate and the temperature of the iron should rise above the selected range.

Furthermore, the absence of a visual signal during the period in which the temperature of the iron is below the selected range tends to permit the attention of the housewife using the iron to be diverted so that the operation of the signal is not noticed, and the housewife is thereby deprived of its benefits.

It is an object of the present invention to provide an electric flatiron having an adjustable automatic temperature control device for maintaining the temperature of the iron within a preselected range, and having signal means providing a uniform signal to show whether or not the temperature of the iron is within said range.

In the preferred form of the invention, it is an object to provide a plurality of signal means in an electric flatiron of the aforesaid type, one for giving a uniform signal as long as the temperature of the iron is within the selected range, and another for giving a uniform but different signal as long as the temperature is outside of this range. By virtue of this arrangement, the operator, after adjusting the iron to remain at a temperature suitable for ironing a given material, is provided at all times with a readily observable signal which shows when to stop and when to go.

A further object is to provide separate heat-responsive means in an iron of the aforesaid type for controlling the temperature of the iron and for controlling the operation of the signal means, so that if one of said means fails to operate, the other will prevent damage to the material being ironed, or will show the user that the iron is not operating at the selected temperature.

Preferably, the signal control means is constructed to have greater sensitivity than the automatic control means in order to facilitate accurate adjustment thereof, and to provide a reliable signal.

An advantageous feature of the present invention is the provision of a single manual control member for adjusting both the automatic temperature control means and the signal means so that the latter will at all times indicate whether or not the temperature is within the range for which the temperature control means is adjusted. The range of adjustment of the manual control member may be suitably calibrated for various materials to be ironed which require various temperature ranges.

In the form of the invention herein illustrated, a signal lamp is also provided for indicating when the current is being used to heat the iron. The lamp is illuminated and extinguished, depending upon whether the circuit to the heating element is closed or open, as a result of the operation of the automatic temperature control device. By viewing the lamp, the operator may observe how much of the time the current is being used.

In the said form of the invention, a plurality of signal lamps are used to indicate the temperature condition of the iron in such a manner that one or the other of the signal lamps is illuminated at all times as long as the iron is connected to a source of energy. By virtue of this combination, the operator is not only informed whether or not the current is being used, but also whether or not the current is "on", and if the connection of the iron to the source of current is inadvertently broken, the operator is immediately apprised of this fact by the absence of the temperature signal.

Other features and advantages will appear in the following description of the preferred embodiment of the invention referring to the accompanying drawing, in which:

Figure 1 is a central vertical cross-section of a flatiron including the improvements of the present invention.

Fig. 2 is a bottom view of the power control thermostat and signal mechanism of the present invention, and is a section substantially along the line 2—2' in Fig. 1.

Fig. 3 is a transverse cross-section of the adjustment member in the control mechanism, including a fragmentary view of an electric contact associated therewith.

Fig. 4 is a fragmentary detail in plan elevation of the control knob for adjusting the thermostats of the iron.

Fig. 5 is a cross-section substantially along the line 5—5' in Fig. 1, of the bimetallic member and cam for operating the signal mechanism.

Fig. 6 is a wiring diagram of the iron according to the invention.

In the embodiment of the invention shown in the drawings, the electric flatiron comprises a sole plate 10, a metal cover 11, bolted to the sole plate, and a handle 12 of suitable insulating material. The front and rear ends of the handle 12 are secured to the cover 11 by means of studs 13, each of which carries radial fins or flanges 14 in spaced relation with the cover and handle for dissipating the heat which would normally be conducted from the cover to the handle by the studs. The sole plate 10 is provided with a heating element 15 of the conventional resistance type.

An automatic temperature control device comprises a bimetallic strip 16, located in a well 10a in the sole plate of the iron, and secured at one end to the sole plate. When the latter is heated, the free end of the strip 16 is adapted to flex upward, the degree of flexure increasing as the temperature rises.

A pair of resilient contact strips 17 and 18 are insulatedly supported above said bimetallic member by means of a resilient spring support 19 secured to the sole plate 10. The spring support 19 also carries a rigid adjusting arm 20 which engages the lower end of the stem of an adjusting screw 21 carried by the cover 11 of the iron. The spring support 19 is adapted to urge the end of the arm 20 against the end of the screw 21, so that the latter acts as a stop which fixes the position of the spring support 19, and positions the associated contact strips 17 and 18.

The contact strips 17 and 18 are of suitable resilient metal, and carry contact buttons 17a and 18a which are normally held in mutual engagement. The free end of the upper strip 18 extends beyond that of the lower strip 17 and is bent downward as indicated at 22. On the lower end of the latter portion, the said strip carries a button 23 of insulating material.

The button 23 is so disposed above the free end of the bimetallic strip 16 that the latter is adapted upon upward flexure to engage the button and raise the contact strip 18 to separate the contact button 18a from the button 17a. The sole plate temperature at which this separation occurs may be raised or lowered by adjusting the screw 21 and thereby raising or lowering the adjustable arm 20.

As indicated in the wiring diagram of Fig. 6, one end of the heating element 15 is connected to a power lead $L_1$, while the other end of said heating element is connected to the contact strip 17. The other contact strip 18 is connected to the other power lead $L_2$. Thus the bimetallic element 16 and the contacts 17 and 18 constitute a thermostatic switch for controlling the energization of the heating element 15 to maintain the temperature of the sole plate of the iron within a given temperature range, and this range may be adjusted by raising or lowering the adjustable arm 20 by means of the screw 21.

The latter comprises a threaded portion 24, engaging a threaded bushing 25 carried by the cover 11 of the iron, the stem portion 26 of said screw extending downward to engage the end of the arm 20. A knob 27 of suitable heat insulating material is secured to the upper end of the screw 21 above the cover 11 and is provided with an indicator 28 to show its position. The pitch of the threads 24 and the characteristics of the bimetal 16 are so correlated that the range of adjustment of the screw 21 corresponding to the entire range of operating temperatures for various fabrics to be ironed, will be less than one revolution of the screw, and is shown in the drawing as being approximately 90 degrees.

The cover 11 may be provided with a dial 29 calibrated as indicated in Fig. 4 so that the position of the indicator 28 on the dial will show the adjustment of the thermostatic switch for temperature ranges suitable, for instance, for ironing linen, cotton, silk, wool, rayon, etc.

As indicated by dotted lines in Fig. 1, the power leads $L_1$ and $L_2$ preferably enter the iron through the rear of the handle 12, a recess 30 being provided therein to house the necessary terminals and connections. The said leads are carried into the iron from said recess through the stud 13 at the rear of the handle 12, said stud being hollow for this purpose.

According to the present invention, space may also advantageously be provided in the recess 30 for an electric lamp 32 positioned adjacent a transparent or translucent window 33. The lamp 32 is shunted by suitable leads across the terminals of the heating element 15 as indicated in the wiring diagram of Fig. 6. Thus, when the contacts 17a and 18a are engaged and the heating element 15 is energized, the lamp 32 is illuminated; while when the said contacts are separated by the bimetallic strip 16, the lamp is extinguished. The lamp thus provides means for observing the length of time that the current is used during the operation of the iron and gives the operator an idea of the economy effected by the thermostat.

According to the present invention, separate means is provided for indicating to the operator when the temperature of the sole plate is within the range for which the knob 27 is adjusted. As shown in the illustrated embodiment of the iron, this means preferably comprises electrically operated signal means which tells the operator when to stop and when to go, each of the signals being uniform and readily observed.

The signal control means comprises a spiral bimetallic member 35 having its inner end secured to a fixed stud 36 which is fastened to the sole plate 10 in a position coaxial with the adjustable screw 21. A metal cup 37 surrounding said spiral bimetallic member 35 is rotatably supported on the stud 36 and is fastened at its periphery to the outer end of the spiral 35. The assembly is mounted on the sole plate 10 by means of the stud 36 in good heat-exchanging relation with the former, and the spiral 35 is adapted to react to any temperature change of the sole plate.

As shown in Fig. 5, the cup 37 has a raised portion constituting a lug or cam 38 on its outer peripheral surface. As the temperature of the sole plate rises, the bimetallic spiral 35 expands and causes the cup 37 and cam 38 to rotate through an arc about the fixed stud 36, the extent of the arcuate motion depending upon the extent of the rise in temperature.

By providing a bimetallic spiral for controlling the signal means, the control of the latter by holding a switch closed within a desired temperature range is rendered more accurate than if a simple bimetallic strip were used. On the other hand, the use of a bimetallic strip for controlling the heating circuit switch where the switch is to be opened or closed at a specific temperature, provides adequately accurate control thereof.

A pair of U-shaped metal contact strips 39 and 40, the midportions of which are semicircular, are insulatedly supported by a bracket 41 of suitable insulating material secured to the inner surface of the cover 11 so that the semi-circular portions are concentric with the screw 21 and the stud 36. The two contact strips are supported for convenience at the same level, the radius of curvature of the semicircular portion of strip 40 being smaller than that of strip 39, so that the curved portions of said strips are separated from each other by a semiannular space.

A metal collar 42 is fastened to the stem 26 of the adjustment screw 21 by means of an insulating bushing 43. In order to secure the said collar and bushing to the stem for rotation therewith, the stem is laterally flattened as shown in Fig. 3.

A fixed contact 44 secured to the insulating bracket 41 engages the metal collar 42 forming electric contact therewith but permitting rotation of the collar with the stem 26.

A resilient metal contact arm 45 is secured to the metal collar 42 and is bent upward and outward, and then downward, so that it extends between the semicircular portions of the contact strips 39 and 40. A contact button 46 on the said arm 45 between the said contact strips is adapted to form electric contact alternately with one or the other of said strips. The resilient arm 45 is bent, however, so that the button 46 is normally urged into contact with the inner strip 40.

The free end of the contact arm 45 carries an insulating tip 47 of suitable oval cross-section as shown in Fig. 2 which extends into the path of the lug or cam 38 on the periphery of the cup 37, movement of which is controlled by the bimetallic spiral 35. Normally, the said tip 47 does not touch the said cup, but when the latter moves to a position so that the lug 38 engages the tip 47, the latter is pushed outward, thereby moving the arm 45 and the button 46 into contact with the outer metal contact strip 39 and breaking the contact with the strip 40.

It will be seen that the level of the temperature range of the sole plate at which the contact arm 45 is engaged by the cam 38 and held in contact with the outer strip 39 is determined by the arcuate adjustment of the screw 21 which is adapted to move the arm 45 arcuately around the common axis of the said screw and of the stud 36. For any given setting of the arm 45, the range of sole plate temperature within which contact is established between the arm 45 and the outer strip 39 is determined by the arcuate length of the lug 38 and the breadth of the tip 47.

Alternate contact of the arm 45 with the strips 39 and 40 is arranged to operate signal means, such as, for instance, two electric lamps having filaments 48 and 49 respectively supported below translucent windows 50 and 51 in the cover 11 of the iron. The window 50 over filament 48 is preferably red, while the window 51 over filament 49 may be green. One end of the filament 48 is connected, for instance, to the inner contact strip 40, and one end of filament 49 to the outer contact strip 39, while as indicated in the wiring diagram of Fig. 6, the opposite ends of the filaments 48 and 49 are permanently connected to one of the power supply leads $L_1$. The movable contact arm 45 and the fixed metal contact 44, associated therewith, are connected to the other supply lead $L_2$.

Accordingly, as long as the cam 38 is not in engagement with the tip 47 of the arm 45, and the latter remains in contact with the strip 40, the filament 48 will be illuminated and a red light will show, while filament 49 will remain inoperative. However, when the cam 48 engages the tip 47, contact arm 45 will establish contact with the outer strip 39, closing the circuit to the filament 49, breaking the circuit to the filament 48, and thus causing the red light to be extinguished and the green light to show.

In order to correlate the operation of the thermostatic heat control switch with that of the signals, the characteristics of the spiral bimetallic member 35 and its associated mechanism are so correlated with the characteristics of the bimetallic strip 16 and its associated mechanism that the angular displacement of the screw 21 required to adjust the thermostatic switch controlled by the bimetallic strip 16 to alter the average temperature at which the sole plate 10 is maintained, by a given increment within the operating temperature range of the iron, is equal to the corresponding angular displacement of the cam 38 occasioned by the said increment in temperature. Moreover, the angular position of the cam 38 is regulated by adjusting the position of the stud 36 on the sole plate, and of the arm 45 on the screw 21 so that the cam 38 is positioned directly below tip 47, when the sole plate is at the average temperature maintained by the thermostatic switch controlled by the bimetallic strip 16; and also so that the arcuate motion of the cam 38 corresponding to the entire operating range of temperature of the iron falls within the semicircle defined by the curved portions of the contact strips 39 and 40.

The arcuate length of the cam 38 is constructed so that, for any given adjustment of the screw 21, the normal fluctuations in the temperatures of the sole plate 10 which occur as a result of the lag in the response of the thermostat switch controlled by the bimetal 16, caused by the lag in the heat conductivity of the portions of the iron between the heating element and said bimetallic strip, will cause the cam to oscillate while maintaining the arm 45 in contact with the outer strip 39, but so that any materially wider fluctuation of temperature above or below the normal range of said fluctuations would cause the cam to release the tip 47 and allow the arm 45 to reestablish contact with the inner strip 40.

Thus, when the screw 21 is originally adjusted, for instance, so that the knob 27 and pointer are set opposite the calibration on the dial 29 for cotton, which requires a relatively high sole plate temperature, and the leads L₁ and L₂ are connected to a source of electric current, the current will flow through the contacts 17a and 18a to the heating element 15 in order to heat the iron. The lamp 32 in the handle of the iron will be illuminated indicating to the operator that the current is on.

Contact arm 45, being in contact with the strip 40, establishes a circuit from the power leads to the filament 48, and causes a red light to show on the cover of the iron, indicating to the operator that the iron has not reached the desired ironing temperature, but that the current is "on."

As the sole plate reaches the desired average temperature, the bimetallic strip 16 begins to operate contact 18 to open and close the circuit intermittently to the heating element thus maintaining the temperature of the sole plate within the desired temperature range. The lamp 32 will be correspondingly extinguished and illuminated as the heating element circuit is opened and closed, showing the operator how much of the time the current is being used.

Meanwhile, the bimetallic spiral 35 moves the cam 38 into engagement with the tip 47 of the contact arm 45, the latter having been positioned by the initial adjustment of the screw 21, and moves the arm 45 into contact with the outer strip 39, breaking the circuit between the said arm and the inner strip 40. As will appear from the foregoing description, this extinguishes the red light on the cover of the iron, and illuminates the green light, providing a signal to the operator that the ironing temperature has been reached, and still providing a signal that the current is "on." By virtue of the arcuate length of the cam 38, the green light will remain on as long as the setting of the screw 21 is not changed and the fluctuations in the temperature of the sole plate remain within the desired operating range.

If the bimetallic strip 16 fails to open the heating circuit at the proper time because of some defect, the temperature of the sole plate will rise above the desired range and cam 38 will move beyond the tip 47, thereby extinguishing the green light and turning on the red light, thus indicating to the operator that the iron is no longer operating properly and that its use should be discontinued. Similarly, if the bimetallic strip 16 fails to permit the heating circuit to close at the proper time and the temperature of the iron falls below the desired temperature, a similar signal is given. On the other hand, if the signals fail to operate properly, and this condition is not immediately noticed by the operator, continued operation of the thermostatic heat control will prevent any damage to the material being ironed.

Assuming now that it is desired to change the setting of the iron in order to iron a more sensitive material, such as silk or rayon, which requires a lower temperature, the knob 47 is turned until the pointer 28 is positioned opposite the name of the desired material on the dial 29. This depresses arm 20, setting the thermostatic switch for the required lower temperature range, and simultaneously moves arm 45 counterclockwise in Fig. 2 through a corresponding angle. The tip 47 of the said arm is moved away from the cam 38, reestablishing contact between the arm 45 and the inner strip 40, thereby illuminating the red light, and indicating to the operator that the temperature of the iron is not within the required range. As the iron cools to the desired temperature range, the bimetallic strip 16 resumes its intermittent opening and closing of the heating circuit, and maintains the sole plate within said temperature range, while the bimetallic spiral 35 moves the lug 38 counterclockwise in Fig. 2 and again engages the tip 47 of arm 45, moving the latter into contact with the strip 39, and thereby reilluminating the green light and extinguishing the red light. The operator is then apprised that the iron is at the required temperature for ironing the material for which it is adjusted.

Obviously, contact 39, filament 49 and the green window 51 could be omitted if desired, the cam 38 merely breaking the circuit to the filament 48 and extinguishing the red light when the iron reaches the desired temperature range. In this case, the red light would indicate to the operator that the iron was not within the desired temperature range, while absence of a signal would show that such a temperature had been reached. Conversely, contact 40 and filament 48 could be omitted, if desired, the cam 38 merely closing the circuit of filament 49 when the iron reaches the desired temperature. In this case, illumination of the green light would inform the operator that the iron had reached the required temperature, while absence of the signal would show that the iron was not within the desired temperature range. However, the provision of a plurality of signal means is preferred, since the failure of one of them would not interfere with the use of the iron. Moreover, by providing signals, one of which is always energized as long as the iron is connected to a source of current, the operator is constantly aware of the condition of the connection. The fact that an easily observed temperature signal is constantly provided tends to retain the operator's attention so that any change in the signal is immediately noticed. From a psychological standpoint, the provision of both a "stop" and a "go" signal is of great advantage.

The lamp 32 may also be omitted in either case, since it is merely provided to inform the operator how much of the time the current is being used during the operation of the iron.

Variations and modifications may be made within the scope of this invention and portions of the improvements may be used without others.

I claim:

1. In an electric iron, two separate electrically operated indicators for indicating the temperature of the iron; a circuit for energizing said indicators whereby one or the other of said indicators is actuated so long as the iron is connected to a source of current; a switch controlling said circuit; a heat-responsive means controlled by the temperature of the iron for operating said switch to actuate one indicator to provide a uniform indication as long as the temperature of the iron remains within a range having predetermined limits, said indicator becoming inoperative, and the other indicator becoming operative to give a different indication when the temperature is materially beyond the limits of said range; and a single means for simultaneously adjusting the level of both limits of said temperature range.

2. In an electric flatiron having automatic temperature control means for maintaining the temperature of the iron within a predetermined range and means for adjusting the average temperature of said range, an indicator for providing a uniform indication as long as the temperature remains within the limits of a predetermined range, said indicator becoming inoperative and a separate indicator becoming operative to give a different uniform indication when the temperature rises or falls beyond said limits; means for operating one or the other of said indicators so long as the flatiron is connected to a source of current; and a single means for simultaneously adjusting both limits of the range of said indicators to correlate the average temperature of ranges thereof with that of the temperature range maintained by said automatic temperature maintaining means.

3. In an electric iron having signal means, a sole plate, a heating element for said sole plate, and an electric power circuit for energizing said heating element; a heat-responsive means in heat-exchange relation with said sole plate; adjustable means operated by said heat-responsive means for controlling said power circuit to maintain the sole plate temperature within a selected range; separate heat-responsive means in heat-exchange relation with the sole plate; adjustable signal control means operated by the latter heat-responsive means for providing a continuous uniform signal as long as the sole plate temperature is within a predetermined range; and common means for simultaneously adjusting said power circuit control means to maintain a selected temperature range and adjusting said signal control means to provide said signal within the same temperature range at various temperature levels.

4. In an electric flatiron having signal means, a sole plate, a heating element for the sole plate, and an electric power circuit for energizing said heating element, a movable heat-responsive member in heat-exchange relation with the sole plate; control means in said power circuit operated by movement of said heat-responsive member to maintain the temperature of the sole plate within a selected range; a second movable heat-responsive member in heat-exchange relation with said sole plate; signal control means controlled by movement of the latter heat-responsive member to provide a continuous uniform signal only as long as the sole plate temperature is within a predetermined range of slightly greater amplitude than said selected temperature range; and common means for adjusting said power circuit control means to maintain the sole plate temperature within a selected range, and adjusting said signal control means to provide said signal within a range including said selected range.

5. In an electric flatiron having signal means, a sole plate, a heating element for the sole plate, and an electric power circuit for energizing said heating element, a movable heat-responsive member in heat-exchange relation with the sole plate; control means in said power circuit operated by movement of said heat-responsive member to maintain the temperature of the sole plate within a selected range; a second movable heat-responsive member in heat-exchange relation with said sole plate, said member being of greater sensitivity than the first-named heat-responsive member; signal control means operated by movement of the latter member to provide a continuous uniform signal only as long as the sole plate temperature is within a predetermined range; and common means for simultaneously adjusting said power circuit control means to maintain a selected sole plate temperature range, and adjusting said signal control means to provide said signal within the same temperature range at various temperature levels.

6. In an electric iron having signal means for indicating the temperature of the iron comprising an electric signal device; a circuit for energizing said signal and a switch controlling said circuit comprising a pair of contacts relatively movable between open and closed circuit positions; means normally urging said contacts to one of said positions; a spiral bimetallic member in heat-exchange relation with the sole plate of said iron; a rotary cam operated by said bimetallic spiral, said cam moving said contacts to the other position and maintaining them in said position to control said circuit for providing a continuous uniform signal only as long as the temperature of the iron remains within a predetermined range; and means for adjusting the relative position of at least one of said contacts with reference to said cam for varying the level of said predetermined temperature range.

7. In an electric flatiron having adjustable automatic means for maintaining the temperature of the iron within a selected range and a pair of signal means for providing different uniform signals, a pair of spaced arcuate concentrically mounted contacts included respectively in a pair of parallel circuits which include said signal means respectively; a contact member arcuately movable between said arcuate contacts in a path concentric therewith, said member being connected to a source of current, and normally urged into engagement with one of said arcuate contacts; a heat-responsive member in heat-exchange relation with said sole plate; a rotary cam controlled by said heat-responsive member, adapted to move said contact member into engagement with the other arcuate contact and to hold it in said engagement as long as the temperature is within a predetermined range; and means for adjusting the position of said rotatable contact member in its arcuate path to adjust said signal means and simultaneously said first-named means for various temperature ranges.

8. In an electric iron, automatic control means for maintaining the temperature of the iron within a predetermined range; signal means for indicating the temperature of the iron comprising an electric signal device; a circuit for energizing said signal; a switch controlling said circuit comprising a pair of relatively movable contacts; a bimetallic member in heat-exchange relation on the sole plate of said iron; a rotary cam operated by said bimetallic member, said cam moving said contacts to control said circuit for providing a uniform signal as long as the temperature of the iron remains within a predetermined range; and common means for adjusting the relative position of at least one of said contacts with reference to said cam for varying the level of said predetermined temperature range, and for simultaneously adjusting said automatic temperature control means to maintain the temperature of the iron within the same range, said common means comprising a screw, translation of which adjusts said automatic temperature control means and rotation of which adjusts said signal means.

9. In an electric iron, automatic control means for maintaining the temperature of the iron within a selected range; signal means for indicating the temperature of the iron comprising an electric signal device; a circuit for energizing said signal; a switch controlling said circuit comprising a pair of relatively movable contacts; a bimetallic member in heat-exchange relation with the sole plate of said iron; a rotary cam operated by said bimetallic member, said cam moving said contacts to control said circuit for providing a uniform signal as long as the temperature of the iron remains within a predetermined range; and common means for adjusting the relative position of at least one of said contacts with reference to said cam for varying the level of said predetermined temperature range, and for simultaneously adjusting said automatic temperature control means to maintain the temperature of the iron within the same temperature range, said common means comprising a screw, translation of which adjusts said automatic temperature control means and rotation of which adjusts the level of the temperature range of said signal means.

10. In an electric iron having a sole plate, a heating element for said sole plate, and an electric power circuit for energizing said heating element; a heat-responsive member in heat-exchange relation with said sole plate; a switch operated by said heat-responsive member for controlling the power circuit to maintain the sole plate within a predetermined temperature range; a pair of spaced arcuate contacts included respectively in a pair of parallel circuits; a pair of signal means included in said circuits; a movable contact member connected to a source of current and normally urged into engagement with one of said arcuate contacts; a second heat-responsive member in heat-exchange relation with said sole plate; a cam controlled by the latter heat-responsive member adapted to move said contact member into engagement with the other arcuate contact, and to hold it in said engagement as long as the temperature is within said predetermined range; and common means for simultaneously adjusting the said power circuit control means and said signal means to operate at various temperature range levels, said means comprising a screw mechanism, translation of which adjusts the switch operated by the first-named heat-responsive member, and rotation of which adjusts the relative position of said cam with reference to said movable contact in the signal circuit to correlate the operation of said signal means and said temperature control means.

11. In an electric iron having a sole plate, a heating element for said sole plate, and an electric power circuit for energizing said heating element; a heat-responsive member in heat-exchange relation with said sole plate; a switch operated by said heat-responsive member for controlling said power circuit to maintain the sole plate within a predetermined temperature range; a pair of spaced arcuate contacts included respectively in a pair of parallel signal circuits; a pair of signal means included respectively in said circuits; a movable contact member connected to a source of current and normally urged into engagement with one of said arcuate contacts; a heat-responsive member comprising a spiral bimetallic strip in heat-exchange relation with said sole plate; a rotary cam controlled by said heat-responsive member and adapted to move said contact member into engagement with the other arcuate contact and to hold it in said engagement as long as the temperature is within said predetermined range, providing a uniform signal as long as the temperature remains within said range, and a different signal when the temperature is beyond the limits of said range; and common means for simultaneously adjusting said power circuit control means and said signal means, said common means comprising a screw mechanism, translation of which adjusts said power circuit switch, and corresponding rotation of which adjusts the relative position of said rotary cam and said movable contact to correlate the operation of said signal means and said temperature control means.

12. In an electric iron having a sole plate, a heating element for said sole plate, and an electric power circuit for energizing said heating element; a bimetallic strip in heat-exchange relation with said sole plate; a switch operated by said bimetallic member and controlling said power circuit to maintain the sole plate temperature within a predetermined range; a spiral bimetallic member in heat-exchange relation with said sole plate; a pair of spaced arcuate contacts included respectively in a pair of parallel signal circuits; a pair of signal means included respectively in said circuits; a movable contact member connected to a source of current and normally urged into engagement with one of said arcuate contacts; a rotary cam controlled by said spiral bimetallic member for moving said movable contact into engagement with one of said arcuate contacts and to hold it in said engagement as long as the temperature is within said predetermined range; and common means for simultaneously adjusting said power circuit control means and said signal means to operate at various temperature range levels, said adjusting means comprising a screw coaxially disposed with reference to said spiral bimetallic member, translation of said screw adjusting said control means for various temperature levels, and rotation of said screw adjusting the relative position of said movable contact and said rotary cam to correlate operation of the signal means with that of the said automatic temperature control means.

13. In an electric flatiron having a sole plate, a heating element for the sole plate and an electric power circuit for energizing said heating element; a movable heat-responsive member in heat-exchange relation with said sole plate; a switch comprising a pair of contacts normally engaging each other in said power circuit, said heat-responsive member separating the contacts and interrupting the circuit when the temperature of said sole plate exceeds a predetermined value, for maintaining the sole plate temperature within a selected range; a second movable heat-responsive member in heat-exchange relation with said sole plate; a pair of spaced contacts included in a pair of parallel circuits; a movable contact connected to a source of current; a pair of signal means included in said parallel circuits, each adapted to give a uniform signal; means operated by the latter heat-responsive member and controlling said movable contact to engage it with one of said spaced contacts as long as the temperature of the sole plate remains within a predetermined range, and moving it into engagement with the other contact when the temperature is outside of said range to energize said signal means respectively; and common means for adjusting the first-mentioned switch to maintain a selected sole plate temperature range, and for adjusting said movable contact relative to said contact control means, to maintain engagement thereof with the first of the spaced contacts, within the same temperature range at various levels, whereby the corresponding signal means is energized.

14. In an electric iron, automatic control means for maintaining the temperature of the iron within a selected range; signal means for indicating the temperature of the iron, comprising an electric signal device; a circuit for energizing said signal device; a switch controlling said circuit comprising a pair of relatively movable contacts; a bimetallic member in heat-exchange relation with the sole plate of said iron; a rotary cam operated by said bimetallic member, said cam moving said contacts to control said circuit for providing a uniform signal as long as the temperature of the iron remains within a predetermined range; and common means for adjusting the relative position of at least one of said contacts with reference to said cam for varying the level of said predetermined temperature range, and for simultaneously adjusting said automatic temperature control means to maintain the temperature of the sole plate within the same temperature range, said common means being mounted for correlated rotary and translatory movement, translation of said common means adjusting said automatic temperature control means, and rotation thereof adjusting the position of said movable contact relative to said cam.

15. An electric iron having two electric signals and circuits for energizing said signals; switch means controlling said circuits comprising a pair of contacts, one for each signal, and another contact common to said pair of contacts, a movable heat-responsive member, and cam means operated by said heat-responsive member for moving said common contact from a position engaging one of said pair of contacts to a position engaging the other of said pair of contacts whereby one of said signals is made operative and the other of said signals is made inoperative, one of said signals being maintained operative so long as the temperature of the iron remains within a predetermined range; and means for adjusting the position of said common contact with reference to said cam means to vary the temperature level at which said signals are given.

16. In an electric flatiron having a heating means, automatically operated means including heat-responsive means for controlling the temperature of the iron; manually operable means settable to select one of a plurality of temperature ranges at which said automatic means is to operate; heat-responsive means independent of the automatic means and responsive to the temperature of the iron; and an electric signal under the joint control of said manually operable means and the last-named heat-responsive means to indicate, independently of the operation of said automatic means, when the temperature of the iron is within the said selected range.

17. In an electric flatiron having a heating means, automatically operated means for controlling the temperature of the iron; manually operable means settable to select one of a plurality of temperature ranges at which said automatic means is to operate; an indicator mounted on the flatiron; and means under the control of said manually operable means and responsive to the actual temperature of the iron to energize the indicator and make it operative to give the same attention-attracting indication for all temperatures of the iron above the selected range.

18. In an electric flatiron having a heating means, automatically operated means for controlling the temperature of the iron; manually operable means settable to select one of a plurality of temperature ranges at which said automatic means is to operate; an indicator mounted on the flatiron; and means under the control of said manually operable means and responsive to the actual temperature of the iron to energize the indicator and make it operative to give the same attention-attracting indication for all temperatures of the iron below the selected range.

19. In an electric flatiron having a heating means, automatically operated means for controlling the temperature of the iron; manually operable means settable to select one of a plurality of temperature ranges at which said automatic means is to operate; an indicator mounted on the flatiron; and means under the control of said manually operable means and responsive to the actual temperature of the iron to energize the indicator and make it operative to give the same attention-attracting indication for all temperatures of the iron above or below the selected range.

20. In an electric flatiron having a heating means, automatically operated means for controlling the temperature of the iron; manually operable means settable to select one of a plurality of temperature ranges at which said automatic means is to operate; an electric stop light mounted on the flatiron; and means responsive to the operation of the manually operable means and the temperature of the iron for energizing the light to illuminate the same and give a positive stop signal when the temperature of the iron is above or below the selected range.

21. In an electric flatiron having a heating means, automatically operated means for controlling the temperature of the iron; manually operable means settable to select one of a plurality of temperature ranges at which said automatic means is to operate; an electric stop light mounted on the flatiron; and means under the control of the manually operable means and responsive to the actual temperature of the iron for energizing the light to illuminate the same and give a positive stop signal when the temperature of the iron is above the selected range.

22. In an electric flatiron having a heating means, automatically operated means for controlling the temperature of the iron; manually operable means settable to select one of a plurality of temperature ranges at which said automatic means is to operate; indicator means including two separate electric indicators, each under the joint control of said manually operable means and the temperature of the iron; and circuit means for operating the indicator means so long as the flatiron is connected to a source of current, one indicator operating to indicate when the temperature of the iron is within said selected range, and the other operating to indicate when the temperature of the iron is outside the said selected range.

23. In an electric flatiron having a heating means, automatically operated means for controlling the temperature of the iron; manually operable means settable to select one of a plurality of temperature ranges at which said automatic means is to operate; and means including an electrical indicator energized concurrently with the changing of the setting of said manually settable means to a different temperature range during the use of the iron for giving a positive warning to the user that the temperature of the iron is not within the new selected range, said means being deenergized when the temperature of the iron reaches said new selected range and while it remains so.

ARTHUR A. JOHNSON.

REFERENCES CITED

The following references are of record in the file of this patent:

UNITED STATES PATENTS

| Number | Name | Date |
|---|---|---|
| 2,208,432 | Samuels | July 16, 1940 |
| 2,159,068 | Young | May 23, 1939 |
| 827,698 | Adams | Aug. 7, 1906 |
| 1,128,081 | Vogel | Feb. 9, 1915 |
| 1,542,096 | Riblet | June 16, 1925 |
| 1,742,138 | Faus | Dec. 31, 1929 |
| 1,831,504 | McIntosh et al. | Nov. 10, 1931 |
| 2,115,027 | Leonard | Apr. 26, 1938 |
| 1,136,407 | Carrigan | Apr. 20, 1915 |
| 1,463,189 | Baker | July 31, 1923 |
| 1,478,271 | Weiss | Dec. 8, 1923 |
| 1,478,084 | Whittington | Dec. 8, 1923 |
| 1,932,071 | Hodges | Oct. 24, 1933 |
| 2,092,085 | Riley | Sept. 7, 1937 |
| 2,088,924 | Ringrose | Aug. 3, 1937 |
| 2,238,071 | Nazar | Apr. 15, 1941 |